United States Patent
Setoguchi et al.

(10) Patent No.: US 6,631,612 B1
(45) Date of Patent: Oct. 14, 2003

(54) DEVICE FOR ELIMINATING PARTICULATES IN EXHAUST GAS AND METHOD FOR ELIMINATING THE PARTICULATES

(75) Inventors: Toshihiko Setoguchi, Nagasaki (JP); Yuichi Fujioka, Nagasaki (JP); Yoshihiko Tsuchiyama, Nagasaki (JP); Toshiaki Ohkubo, Nagasaki (JP); Akinori Yasutake, Nagasaki (JP); Norihisa Kobayashi, Tokyo (JP); Akira Hattori, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/736,255

(22) Filed: Dec. 15, 2000

(30) Foreign Application Priority Data

Dec. 17, 1999 (JP) .......................... 11-358718

(51) Int. Cl.⁷ ................................ F01N 3/00
(52) U.S. Cl. ........................... 60/295; 60/311
(58) Field of Search ................. 60/295, 297, 310, 60/311; 55/DIG. 30

(56) References Cited

U.S. PATENT DOCUMENTS

| | | | | |
|---|---|---|---|---|
| 3,289,397 A | * | 12/1966 | Schonewald et al. | |
| 3,763,631 A | * | 10/1973 | Horn et al. | 55/233 |
| 4,276,066 A | * | 6/1981 | Bly et al. | 60/311 |
| 4,415,344 A | * | 11/1983 | Frost et al. | 55/DIG. 30 |
| 4,573,317 A | * | 3/1986 | Ludecke | 60/311 |
| 4,631,076 A | | 12/1986 | Kurihara et al. | |
| 4,641,496 A | * | 2/1987 | Wade | 60/311 |
| 4,652,286 A | * | 3/1987 | Kusuda et al. | 55/DIG. 30 |
| 4,710,520 A | * | 12/1987 | Klein | 55/524 |
| 4,869,738 A | * | 9/1989 | Alcorn et al. | 55/DIG. 30 |
| 5,013,340 A | * | 5/1991 | Taslim et al. | 60/311 |
| 5,051,391 A | * | 9/1991 | Tomisawa et al. | 502/242 |
| 5,322,671 A | * | 6/1994 | Shustorovich et al. | 60/299 |
| 5,386,690 A | * | 2/1995 | Shustorovich et al. | 60/274 |
| 5,451,558 A | * | 9/1995 | Campbell et al. | 502/325 |
| 5,655,212 A | * | 8/1997 | Sekhar et al. | 60/274 |
| 5,820,836 A | | 10/1998 | Morlec et al. | |
| 5,912,190 A | | 6/1999 | Barr et al. | |
| 5,967,771 A | | 10/1999 | Chen et al. | |
| 6,253,543 B1 | * | 7/2001 | Russell | 60/311 |

FOREIGN PATENT DOCUMENTS

| | | | |
|---|---|---|---|
| JP | 356000509 | * | 1/1981 |
| WO | 97/28358 A1 | | 8/1997 |

* cited by examiner

*Primary Examiner*—Thomas Denion
*Assistant Examiner*—Diem Tran
(74) *Attorney, Agent, or Firm*—Birch, Stewart, Kolasch & Birch, LLP

(57) ABSTRACT

A device to eliminate particulates contained in exhaust gas ejected from motors, such as diesel engines for ships, surface transportation vehicles and overland fixed diesel engines, and a process to eliminate particulates contained in the exhaust gas are provided.

The device of the present invention is a device for eliminating particulates contained in exhaust gas 10 ejected from diesel engines constituted by a discoid-shaped filter 11 used as a capturing means to capture the particulates and sprayers 13 having a plurality of nozzles 13*a*, such as spray type and shower type, used as a catalyst attaching means to attach an alkaline metal catalyst solution 12 onto the surface of the captured particulates in the discoid-shaped filter 11, and the device attaches the catalyst onto the surface of the captured particulates, and then burns and decomposes the unburned particulates portion in the exhaust gas.

23 Claims, 22 Drawing Sheets

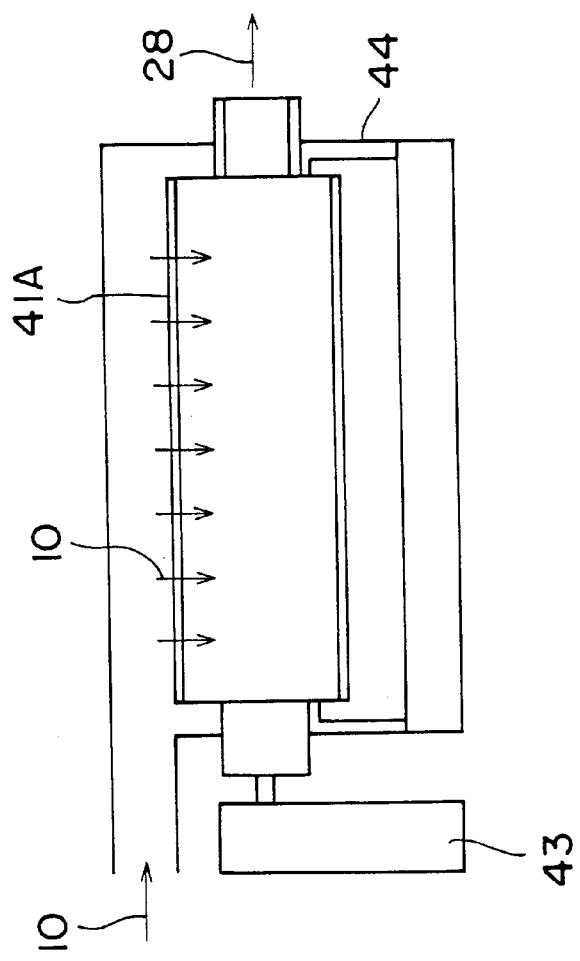
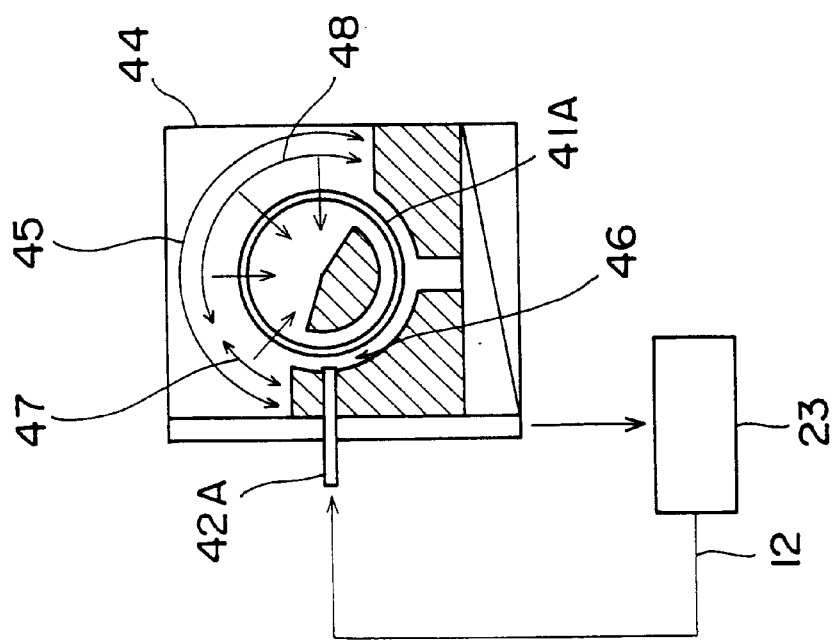
FIG. 6B
FIG. 6A

DEVICE FOR ELIMINATING PARTICULATES IN EXHAUST GAS AND METHOD FOR ELIMINATING THE PARTICULATES

BACKGROUND OF THE INVENTION

1. Field of Invention

The present invention is related to a device for eliminating particulates contained in exhaust gas to eliminate and decompose floating particulates (SPM) contained in exhaust gas generated from motors, such as diesel engines for ships, surface transportation vehicles and overland fixed uses.

2. Background Art

In the past, DPF (Diesel Particulate Filter) using a honeycomb-shaped filter made of ceramics, etc. has been proposed for decomposing floating particulates (SPM, hereinafter called as "Particulates") contained in exhaust gas generated from diesel engines for ships, surface transportation vehicles and overland fixed use, wherein the particulates are captured by DPF, and DPE which had captured a great amount of the particulate is burned to eliminate the particulates for the regeneration of the filter since the exhaust resistance increases when the accumulation of the captured particulates became heavy.

As the regeneration method, a method to improve exhaust temperature by throttling, and a method to burn the un-burned component of the captured particulates after elevating the exhaust gas temperature by means of heating using a heater, supplemental burning, etc.

However, there is a problem as follows in the decomposing method of the particulates in the past.

(1) Due to the repetition of thermal impact in the regeneration, damage to the honeycomb-shaped ceramics filter may occur.

(2) Due to generation of abnormal burning, the thermal resistance and the thermal shock resistance of the filter material deteriorate, thus causing damage to the filter.

(3) Since utility cost, such as for heating by a heater, for supplemental burning, and for required fuels, may be further required, there is a requirement to reduce the cost for such treatment.

(4) When the burning is not sufficient, pressure loss increases to unable the system to use, consequently requiring exchange of the filter itself.

Considering the problems as described above, it is an object of the present invention to provide a device and a method to eliminate particulates contained in exhaust gas, which requires no heating means, such as a heater, and enable to decompose the particulates in exhaust gas at a low temperature.

SUMMARY OF THE INVENTION

The device for eliminating particulates in exhaust gas according to the present invention, which solves the problem described above, is constituted by a capturing means to capture the particulates and a catalyst attaching means to attach the catalyst solution onto the surface of the particulates captured by the capturing means and is characterized by burning and decomposing the captured particulates.

Constituting the device for eliminating particulates in exhaust gas with a capturing means to capture the particulates and a catalyst attaching means to attach the catalyst solution onto the surface of the captured particulates by the capturing means as described above, it enables to eliminate the particulates at a low temperature by means of burning and decomposing the captured particulates.

Preferably, in the device for eliminating the particulates in exhaust gas expelled from a motor described above, wherein the device is constituted by a capturing means to capture the particulates and a catalyst attaching means to attach the catalyst solution onto the surface of the particulates being captured by the capturing means, and the device burns and decomposes the captured particulates.

Constituting the device for eliminating the particulates contained in exhaust gas to eliminate the particulates in the exhaust gas ejected from a motor as described above, wherein the device is constituted by a capturing means to capture the particulates and a catalyst attaching means to attach the catalyst solution onto the surface of the particulates captured by the capturing means, it enables to eliminate the particulates contained in the exhaust gas ejected from diesel engines, for example, by means of burning and decomposing the captured particulates at a low temperature.

Preferably, the device for eliminating the particulates in exhaust gas describe above can be prepared by equipping a spraying means to spray the catalyst solution to the capturing means, whereto the particulates are captured, onto the catalyst attaching means to attach the catalyst solution onto the surface of the particulates.

Constituting the device for eliminating the particulates in exhaust gas as described above, wherein a spraying means to spray the catalyst solution to the capturing means, whereto the particulates are captured, is equipped onto the catalyst attaching means to attach the catalyst solution onto the surface of the particulates, it enables to cover the surface of the particulates efficiently with the catalyst solution. Further, because of preparing in such constitution, the spraying operation can be firmly achieved even under unfavorable condition, such as vibration.

Preferably, in the device for eliminating the particulates in exhaust gas described above, the catalyst attaching means to attach the catalyst solution onto the surface of the particulates is a soaking means to soak the capturing means having captured the particulates into the catalyst solution.

Constituting the device for eliminating the particulates in exhaust gas as described above, wherein the catalyst attaching means to attach the catalyst solution onto the surface of the particulates is a soaking means to soak the capturing means having captured the particulates into the catalyst solution, it enables to cover the surface of the particulates on the capturing means with the catalyst solution even though the filter has a complex shape.

Preferably, in the device for eliminating the particulates in exhaust gas described above, the catalyst solution is any of a catalyst solution containing at least one of an alkali metal and an alkaline earth metal, seawater, and seawater containing at least one of the alkali metal and the alkaline earth metal.

Constituting the device for eliminating the particulates in exhaust gas as described above, wherein the catalyst solution is any of a catalyst solution containing at least one of alkali metals and alkaline earth metals, seawater, and seawater containing at least one of the alkali metals and the alkaline earth metals, the cost for the catalyst solution becomes less expensive, it enables to reuse the sprayed catalyst solution.

Preferably, in the device for eliminating the particulates in exhaust gas described above, the catalyst is carried onto the capturing means.

Constituting the device for eliminating the particulates in exhaust gas described above, wherein the catalyst is carried onto the capturing means, it enables to synergistically decompose the particulates based on catalytic activity with a catalyst other than alkaline catalysts.

Preferably, in the device for eliminating the particulates in exhaust gas described above, the capturing means to capture the particulates is either a discoid-shaped filter or a cylinder-shaped filter.

Constituting the device for eliminating the particulates in exhaust gas as described above, wherein the capturing means to capture the particulates is either a discoid-shaped filter or a cylinder-shaped filter, the device can be produced easily and in a compact size.

Preferably, in the device for eliminating particulates in exhaust gas described above, the filter is either the internal direction filtration type to flow out the exhaust gas having been introduced into the inside of the filter or the external direction filtration type to feed the exhaust gas having been introduced into the exterior of the filter into the inside of the filter.

Constituting the device for eliminating particulates in exhaust gas as described above, wherein the filter is either an internal direction filtration type to flow out the exhaust gas introduced into the inside of the filter or an external direction filtration type to feed the exhaust gas introduced into the exterior of the filter into the inside of the filter, it enables to capture the particulates contained in the exhaust gas in an efficient way. In particular, the external direction filtration type filter facilitates to eliminate the unburned substance.

Preferably, in the device for eliminating particulates in exhaust gas described above, the filter has a laminated structure having a supporting layer to hold the strength of the filter and a capturing layer to capture the laminated particulates onto the supporting layer.

Constituting the device for eliminating particulates in exhaust gas as described above, wherein the filter has a laminated structure having a supporting layer to hold the strength of the filter and a capturing layer to capture the laminated particulates onto the supporting layer, it enables to capture the particulates very efficiently.

Preferably, in the device for eliminating particulates in exhaust gas described above, a protective layer for the particulates is mounted onto the capturing layer.

Constituting the device for eliminating particulates in exhaust gas as described above, wherein a protective layer for the particulates is provided onto the capturing layer, it enables to prolong the longevity of the filter.

Preferably, in the device for eliminating particulates in exhaust gas described above, the cross section of the filter assumes a convexo-concave shape.

Constituting the device for eliminating particulates in exhaust gas as described above, wherein the cross section of the filter assumes a convexo-concave shape, it enables to expand the area for the filtration.

Preferably, in the device for eliminating particulates in exhaust gas described above, a plurality of cylinder-shaped filters are set in standing state onto the surface of the filter.

Constituting the device for eliminating particulates in exhaust gas as described above, wherein a plurality of cylinder-shaped filters are set in standing state onto the surface of the filter, it enables to improve the filtration area of the filter.

Preferably, in the device for eliminating particulates in exhaust gas described above, the capturing means to capture the particulates is a discoid-shaped filter, and the catalyst attaching means to attach the catalyst solution onto the surface of the particulates is set at the surface side of the discoid-shaped filter, and device rotates the discoid-shaped filter, then sprays the catalyst solution onto the surface of the filter at the different positions on the same side of the surface of the discoid-shaped filter, and burns the particulates having been not burned in the exhaust gas following to drying of the said filter to eliminate the particulates.

Constituting the device for eliminating particulates in exhaust gas as described above, wherein the capturing means to capture the particulates is a discoid-shaped filter, and the catalyst attaching means to attach the catalyst solution onto the surface of the particulates is set at the surface side of the discoid-shaped filter, and the device rotates the discoid-shaped filter, then sprays the catalyst solution onto the surface of the filter at the different positions on the same side of the surface of the discoid-shaped filter and burns the particulates having been not burned in the exhaust gas following to drying of the said filter to eliminate the particulates, it enables to capture, burn and decompose the particulates very efficiently.

Preferably, in the device for eliminating particulates in exhaust gas described above, the capturing means to capture the particulates is a cylinder-shaped filter, the catalyst attaching means to attach the particulates in the exhaust gas from either side of inside or outside of the cylinder-shaped filter and to attach the catalyst solution onto the surface of the particulates is set to the interior side of the lateral side of the cylinder-shaped filter in case of the internal direction filtration or is set to the exterior side of the lateral side of the cylinder-shaped filter in case of the external direction filtration, and the device sprays the catalyst solution onto the surface of the filter while rotating the cylinder-shaped filter and burns the particulates having been not burned in the exhaust gas following to drying of the filter to eliminate the particulates.

Constituting the device for eliminating particulates in exhaust gas as described above, wherein the capturing means to capture the particulates is a cylinder-shaped filter, the catalyst attaching means to attach the particulates in the exhaust gas from either the inside or the outside of the cylinder-shaped filter and to attach the catalyst solution onto the surface of the particulates is set to the interior side of the lateral side of the cylinder-shaped filter in case of the internal direction filtration type or is set to the exterior side of the lateral side of the cylinder-shaped filter in case of the external direction filtration type, and the device sprays the catalyst solution onto the surface of the filter while rotating the cylinder-shaped filter and burns the particulates having been not burned in the exhaust gas following to drying of the filter to eliminate the particulates, it enables to capture, burn and decompose the particulates very efficiently.

Preferably, in the device for eliminating particulates in exhaust gas described above, the capturing means to capture the particulates is a cylinder-shaped filter, and at least the two catalyst attaching means to attach the particulates in the exhaust gas from the outside of either the cylinder-shaped filter or the polygon-shaped filter and to attach the catalyst solution onto the surface of the particulates are arranged in the circumferential direction of the filter, and the device sprays the catalyst solution from the surrounding of the filter onto the surface of the filter while switching the catalyst attaching means and burns the particulates having been not burned in the exhaust gas following to drying of the sprayed filter.

Constituting the device for eliminating particulates in exhaust gas as described above, wherein the capturing means to capture the particulates is a cylinder-shaped filter, and at least the two catalyst attaching means to attach the particulates in the exhaust gas from the outside of either the cylinder-shaped filter or the polygon-shaped filter and to attach the catalyst solution onto the surface of the particulates are arranged in the circumferential direction of the filter, and the device sprays the catalyst solution from the surrounding of the filter onto the surface of the filter while switching the catalyst attaching means and burns the particulates having been not burned in the exhaust gas following to drying of the sprayed filter, it enables to capture the particulates well, and burn and decompose the particulates very efficiently without rotating the filter.

Preferably, in the device for eliminating particulates in exhaust gas described above, the capturing means to capture the particulates is a honeycomb-shaped filter provided with a choke of which end surface being checked and the device attaches the particulates in the exhaust gas onto the surface of the filter, sprays the catalyst solution onto the surface of the particulates and then burns the particulates having been not burned in the exhaust gas following to drying of the sprayed filter.

Constituting the device for eliminating particulates in exhaust gas as described above, wherein the capturing means to capture the particulates is a honeycomb-shaped filter provided with a choke of which end surface being checked pattern, and the device attaches the particulates in the exhaust gas onto the surface of the filter, sprays the catalyst solution onto the surface of the particulates and then burns the particulates having been not burned in the exhaust gas following to drying of the sprayed filter, it enables to capture the particulates well and it can be constituted in a compact size.

Preferably, in the device for eliminating particulates in exhaust gas described above, the capturing means to capture the particulates is a laminated type filter being constituted by laminated plate-shaped filters of which end parts are alternatively choked, and the device attaches the particulates in the exhaust gas onto the surface of the filter, sprays the catalyst solution onto the surface of the particulates and then burns the particulates in the exhaust gas having been not burned following to drying of the sprayed filter.

Constituting the device for eliminating particulates in exhaust gas as described above, wherein the capturing means to capture the particulates is a laminated type filter being constituted by laminated plate-shaped filters of which end parts are alternatively choked, and the device attaches the particulates in the exhaust gas onto the surface of the filter, sprays the catalyst solution onto the surface of the particulates and then burns the particulates in the exhaust having been not burned following to drying of the sprayed filter, it enables to capture, burn and decompose the particulates well. Further, the device can be constituted in a compact size and can facilitate the elimination of the unburned substance.

Preferably, in the device for eliminating particulates in exhaust gas described above, the capturing means to capture the particulates is a laminated filter constituted by folding plate-shaped filters, and the device attaches the particulates in the exhaust gas onto the surface of the filter, sprays the catalyst solution onto the surface of the particulates and then burns the particulates having been not burned in the exhaust gas following to drying of the sprayed filter.

Constituting the device for eliminating particulates in exhaust gas as described above, wherein the capturing means to capture the particulates is a laminated type filter constituted by folding plate-shaped filters, and the device attaches the particulates in the exhaust gas onto the surface of the filter, sprays the catalyst solution onto the surface of the particulates and then burns the particulates having been not burned in the exhaust gas following to drying of the sprayed filter, it enables to capture, burn and decompose the particulates well. Further, the device can be constituted in a compact size and can facilitate the elimination of the unburned substance.

Preferably, in the device for eliminating particulates in exhaust gas described above, the capturing means to capture the particulates is constituted by arranging a plurality of doughnut-shaped, fistulous and discoid filters in parallel, and the device attaches the particulates in the exhaust gas onto the surface of the filter, sprays the catalyst solution onto the surface of the particulates and then burns the particulates having been not burned in the exhaust gas following to drying of the sprayed filter.

Constituting the device for eliminating particulates in exhaust gas as described above, wherein the capturing means to capture the particulates is constituted by arranging a plurality of doughnut-shaped, fistulous and discoid filters in parallel, and the device attaches the particulates in the exhaust gas onto the surface of the filter, sprays the catalyst solution onto the surface of the particulates and then burns the particulates having been not burned in the exhaust gas following to drying of the sprayed filter, it enables to capture, burn and decompose the particulates well. Further, the device can be constituted in a compact size and can facilitate the elimination of the unburned substance.

The process for eliminating particulates in exhaust gas according to the present invention is characterized in that the process is constituted by a step to capture the particulates, a step to attach a catalyst solution onto the surface of the captured particulates and a step to burn and decompose the particulates.

Constituting the process for eliminating particulates in exhaust gas as described above, which captures the particulates in exhaust gas ejected from the motors, attaches a catalyst solution onto the surface of the captured particulates and then burns and decomposes the particulates while covering the particulates with the catalyst solution, it enables to eliminate the particulates in the exhaust gas at a low temperature.

Preferably, in the process described above, the catalyst solution is sprayed onto the surface of the particulates being attached onto the surface of the capturing means and is attached to the surface of the captured particulates.

Constituting the process as described above, wherein the catalyst solution is sprayed onto the surface of the particulates being attached onto the surface of the capturing means to attach the catalyst solution onto the surface of the captured particulates, it enables to eliminate the particulates in the exhaust gas at a low temperature.

Preferably, in the process described above, the capturing means whereto the particulates having been attached onto the surface thereof is soaked into the catalyst solution to attach the catalyst solution onto the surface of the captured particulates.

Constituting is the process as described above, wherein the capturing means whereto the particulates having been attached onto the surface thereof is soaked into the catalyst solution to attach the catalyst solution onto the surface of the captured particulates, it enables to eliminate the particulates in the exhaust gas at a low temperature.

The exhaust gas treating system to clean up the exhaust gas according to the present invention is characterized in that the system is set onto the flue for the exhaust gas and having any one of the particulate eliminating devices as described above to decompose and treat the floating particulates in the exhaust gas.

Constituting the exhaust gas treating system to clean up the exhaust gas ejected from motors as described above, wherein the system is set onto the flue for the exhaust gas from motors and having the particulate eliminating device described above through 19 to decompose and treat the floating particulates in the exhaust gas, it enables to eject the exhaust gas in a form of clean gas, from which the particulates have been eliminated.

Preferably, in the exhaust gas treating system to clean up the exhaust gas described above, a denitrification device to decompose and treat nitrogen oxides in the exhaust gas is provided at the downstream side of the particulate eliminating device.

Constituting the exhaust gas treating system to clean up the exhaust gas as described above, wherein a denitrification device to decompose and treat nitrogen oxides contained in the exhaust gas is provided at the downstream side of the particulate eliminating device, it enables to eject the exhaust in a form of clean gas, from which the particulates and hazardous substance, such as nitrogen oxides, have been eliminated, to the outdoor.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings, in which;

FIG. 1 shows an example for the filter used in the present invention.

FIG. 6 is a schematic for showing the device for eliminating particulates contained in exhaust gas according to the third embodiment for the present invention.

FIG. 17 shows various types of mounting manners for the filter.

DETAILED DESCRIPTION OF PREFERRED EMBODIMENTS

Now, the embodiments for carrying out the present invention are explained in the following, however, it should be noted that the scope of the present invention should not be limited to the description in the following embodiments.

The particulate eliminating device according to the present invention is a device to eliminate particulates in exhaust gas expelled from motors, such as diesel engine, gasification furnace, etc. and is constituted by equipping thereon with a capturing means to capture the particulates and a catalyst attaching means to attach the catalyst solution onto the surface of the particulates being captured in the capturing means, thereby burning and decomposing the particulates having been not burned in the exhaust gas while covering the whole particulates being captured with the catalyst solution.

As the capturing means to capture the particulates, a discoid-shaped filter or a cylinder-shaped filter can be given as examples, however, any filter having a shape capable of capturing the particulates in the exhaust gas and being attached with the catalyst solution, for example, honeycomb-shaped filter, can be used without limitation.

First Embodiment

Figure 1A:
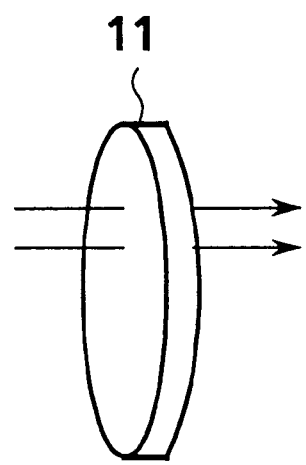
FIG. 1(A) is an asquint view of a discoid-shaped filter.

Now, as an embodiment for the present invention, a device for eliminating particulates in exhaust gas using a discoid-shaped filter 11 as shown in FIG. 1(A) is explained.

Figure 2:
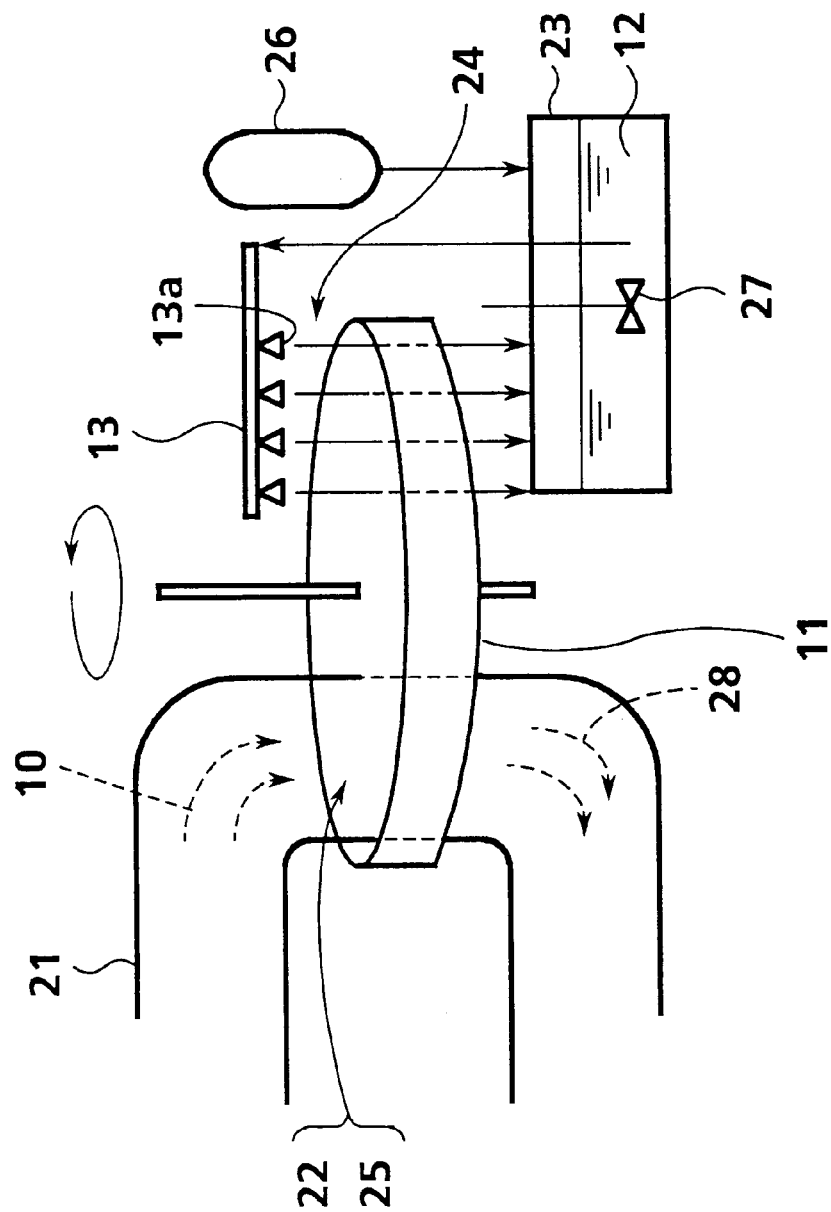
FIG. 2 is a schematic for showing the particulate eliminating device according to the first embodiment for the present invention.

FIG. 2 is a schematic for the device to eliminate particulates in exhaust gas according to the first embodiment.

The device for eliminating particulates according to this embodiment is constituted by a discoid-shaped filter 11 having an axial core in vertical axis direction, the part of which filter is rotatably set in the interior of the flue 21, a capturing zone 22 to capture the particulates contained Sin the exhaust gas 10 in the flue 21, a catalyst carrying zone 24 to spray in the outside of the flue the catalyst solution 12 fed from a catalyst storing tank 23 by using a spray means 13 onto the rotating filter 11 having captured the particulates and a burning zone 25 where the carried catalyst is coming into the flue 21 again and burning the particulates having been not burned in combination with heat generated from the exhaust 10.

In the catalyst storing tank 23, an alkali metal catalyst solution, either $K_2CO_3$ or seawater, is fed from a storing tank 26, stored therein and stirred by a stirring means 27.

The remain of the catalyst solution 12 sprayed at the catalyst carrying zone 24 is recovered into the catalyst storing tank 23, and the remaining catalyst solution may contains non-burned carbon as the non-burned carbon may sometime drop into the remaining catalyst solution at the time of recovering.

The device according to this embodiment captures particulates in exhaust gas 10 on the surface of a filter 11 at the particulate capturing zone 22, sprays the catalyst solution 12 onto the captured particulates so as to cover the surface of the particulates with the catalyst solution in the catalyst carrying zone 24, dries the catalyst while rotating the filter 12 and burns the particulates again in the combustion zone 25 in the flue to decompose the non-burned particulates, such as suite and tar, at a low temperature as high as 300° C. and to make the exhaust gas to clean gas 28.

Figure 3:
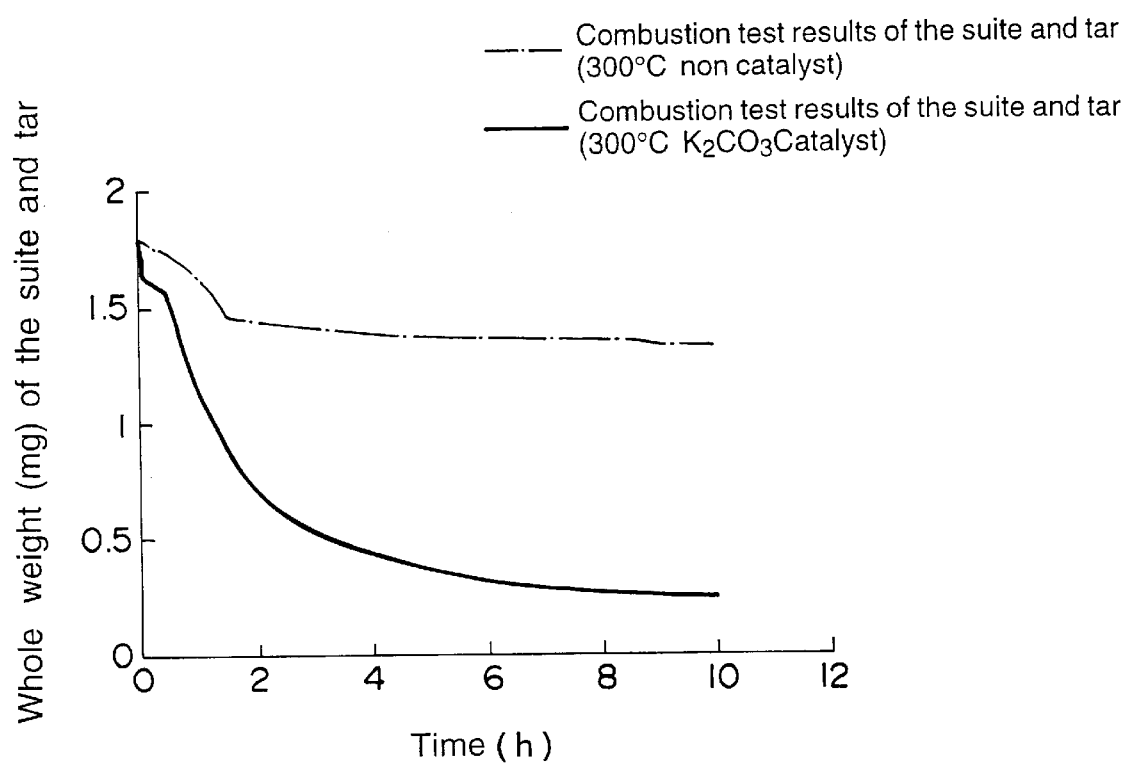
FIG. 3 is a diagram for showing the result of combustion tests on suite and tar comprising the particulates.

Combustion test results of the suite and tar comprising the particulates are presented in FIG. 3. In FIG. 3, the whole weight (mg) of the suite and tar is presented on the vertical axis and the elapsed time (h) is presented on the horizontal axis.

In FIG. 3, the solid line represents the result obtained for the device according to the present invention, which shows the decomposing effect by spraying the catalyst, $K_2CO_3$, at 300° C. From the figure, it is understood that the weight of the suite and tar are decreasing along with the time elapse. On the other hand, the broken line represents the result obtained for the conventional device with no catalyst spray, where the reduction rate in the weight of the suite and tar is found to be low in comparison with that obtained by the device of the present invention.

In the present invention, the catalyst is defined as the one at least containing one of alkali metals and alkaline earth metals, such Na and K including potassium carbonate and sodium carbonate. Seawater is also usable as an alkaline catalyst. Also, at least one of the alkali metal or the alkaline earth metal can be contained in seawater to use as the catalyst.

The device of the first embodiment for the present invention allows to uniformly distribute the catalyst by spraying the alkaline catalyst solution onto the surface of the captured particulates on the filter so as to cover the surface of the particulates with the alkaline catalyst solution to facilitate the absorption and carrying of the alkaline catalyst solution onto the filter, thereby allowing to make the combustion space uniform and enable the catalytic combustion at a lower temperature (300° C.) than the burning temperature of higher than 400° C. when using a conventional heater.

Therefore, the device of the first embodiment prevents to cause abnormal combustion happened at burning the particulates in the past and can control the combustion temperature by means of spraying the catalyst solution in a way by adjusting the spraying amount and the spraying time and by adjusting the rotation speed of the filter, depending upon the combustion temperature.

It is required to choose a material with excellent resistance to heat and impact for the filter 11 as the filter is repeatedly subjected to the burning and the spraying with aqueous solution. As examples for the filter resistant to heat and impact, a heat-resisting ceramics filter or the like can be given.

Additionally, as examples for the heat- and impact-resisting filter, a laminated metal mesh type filter prepared by laminating metal filters onto the supporting layer for providing strength to the filter and a laminated metal unwoven cloth type filter prepared by laminating metal unwoven cloths onto the supporting layer for providing strength to the filter can be given.

Figure 4A:
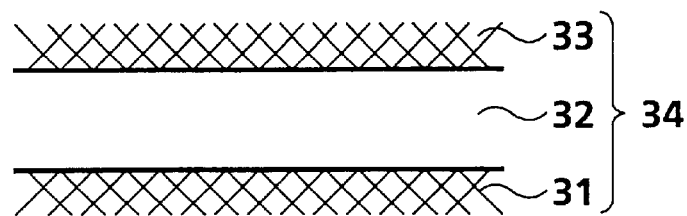
FIG. 4 is a schematic for showing the constitution of the filter.

As shown in FIG. 4(A), a laminated ceramics filter 34 constituted by arranging a ceramics layer 32 onto the upper side of the supporting layer 31 and a protective mesh layer 33 for protecting the ceramics layer 32 can be also used as said heat and impact-resisting filter.

If required, a metal catalyst, such as platinum or the like, may be used for carrying it onto the filter.

Other than platinum, rhodium, palladium, etc. can be used as the metal catalyst, and titanium oxide, aluminium oxide, cojulite, aluminum silica, zeolite, porous silicate, porous aluminate, and complex oxides having perovskite structure and spinel structure and the like can be given as examples for the oxide catalyst, though there is no limitation for such catalysts in the present invention.

At the surface side of the filter, decomposition efficiency of the particulates may be further improved owing to combination effect of the catalytic action given by the catalyst contacting to the particulates and the catalytic action given by the alkaline catalyst attached to the particulates.

Figure 4B:
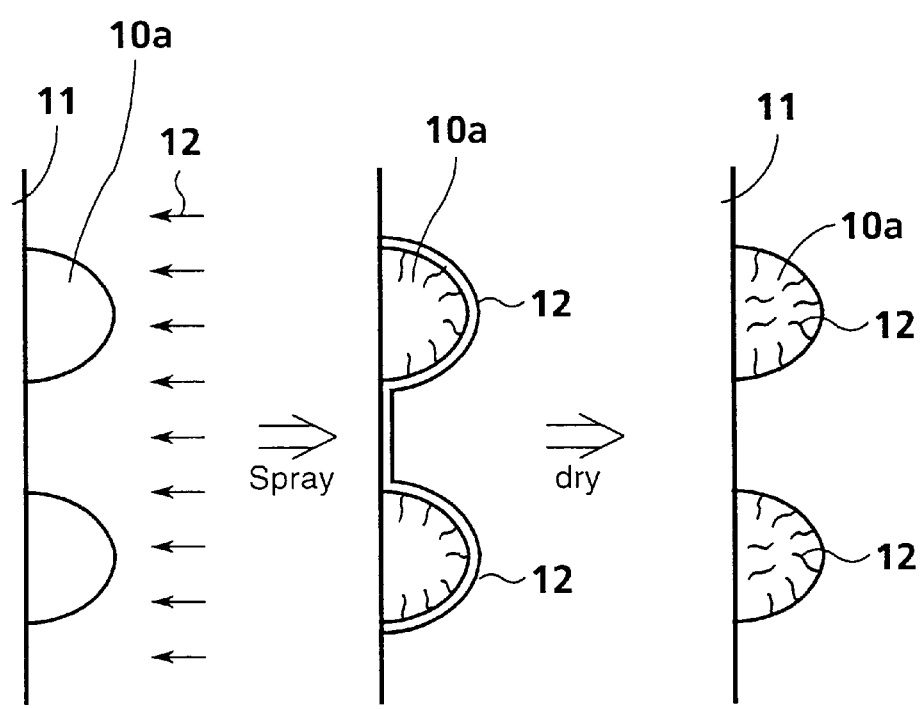

Now, the mechanism and the effect of the catalyst specified in the present invention to eliminate the particulates are presented in FIG. 4(B). As shown in FIG. 4, the particulates 10a contained in the exhaust gas are attached to the surface of the filter 11 at first. Then, after spraying the catalyst solution 12, the catalyst solution 12 covers the surface of the particulates. Along with the covering with the catalyst solution 12 onto the particulates 10a, the catalyst solution is penetrating into the fine pores on the particulates 10a. After drying the filter, the catalyst solution having covered the surface of the particulates 10a is also dried and the component having the catalytic activity remains onto the surface of the particulates in a state being uniformly distributed. In addition, the catalyst solution penetrated into the inner part of the particulate is also dried, thereby allowing the component having the catalytic activity uniformly remain in the inner part of the particulate. Consequently, the catalytic reaction may take place not only on the surface of the particulates but also in the inner part of the particulates, thereby allowing complete burning of the particulates.

The device provided in the present invention can decompose and treat the particulates contained in exhaust gas generated from motors irrespective of the type of the motors.

For example, non-burned portion of floating particulates (SPM) contained in exhaust gas generated from motors, such as diesel engines for ships, for surface transportation vehicles and for overland fixed use, can be decomposed and treated at a low temperature. Furthermore, the device provided in the present invention can decompose and treat not only particulates in exhaust gas ejected from motors but also particulates contained in exhaust gas generated from various incinerators, such as urban garbage incinerators, industrial waste and sludge incinerators, thermal decomposition furnaces, fusing furnaces, etc.

Second Embodiment

In the present invention, as the catalyst attaching means to attach the catalyst solution onto the surface of the particulates, as described above, a soaking means to soak the capturing means having captured the particulates in the catalyst solution is given other than a spraying means to spray the catalyst solution onto the filter 11 having captured the particulates.

In the present embodiment, a device for eliminating particulate in exhaust gas using a discoid-shaped filter and carrying a catalyst by using a soaking means is described.

Figure 5:
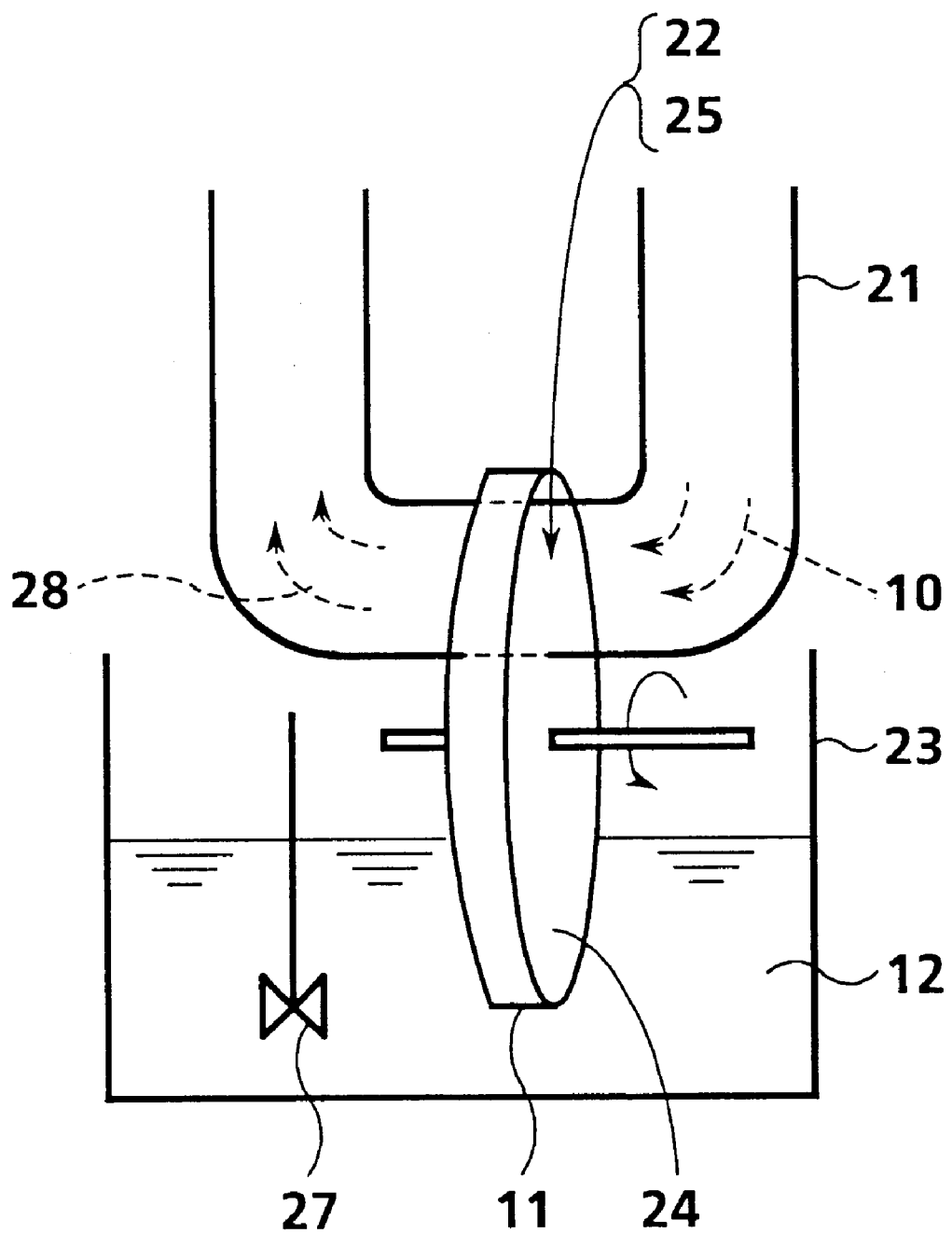
FIG. 5 is a schematic for showing the device for eliminating particulates contained in exhaust gas according to the second embodiment for the present invention.

FIG. 5 is a schematic for showing the device for eliminating particulates in exhaust gas according to the second embodiment.

As shown in FIG. 5, the device for eliminating particulates contained in exhaust gas according to the present embodiment is constituted by a discoid-shaped filter 11 having the axial core in the orthogonal direction to the vertical axis, a capturing zone 22 to capture the particulates contained in the exhaust gas 10a in the flue, wherein a part of the filter 11 is rotatably set in the flue 21 for the exhaust gas, a catalyst carrying zone 25, wherein the filter 11 having captured particulates is rotated and the filter 11 is soaked in the catalyst storing tank 23 on outside the flue, and a burning zone 26, where the catalyst being carried is fed again into the flue 21 and burned at the temperature of combustion gas.

The storing tank 27 may contain unburned carbon being attached to the surface of the filter, since the filter is soaked in the catalyst carrying zone 25.

Description on the mechanism to decompose the particulates is same as the mechanism in the first embodiment.

This soaking type device is suitable for exhaust gas treatment for overland-fixed motors, and it is required to equip a quake-preventing means to the device when applying it for motors for ships and surface transportation vehicles.

Third Embodiment

Figure 1B:
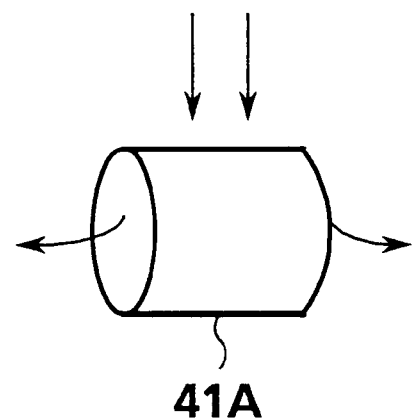
FIG. 1(B) and 1(C) are an asquint view of a cylinder-shaped filter, respectively.
Figure 1C:
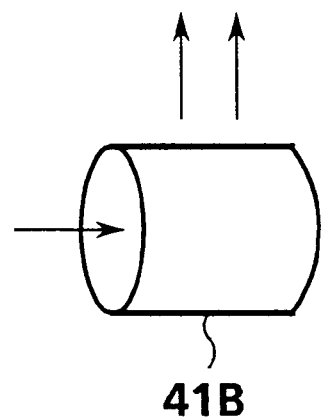

In the present invention, there is no limitation in the filter structure, and a discoid-shaped filter as shown in FIG. 1(A), a cylinder-shaped filter as shown in FIGS. 1(B) and 1(C), etc. can be given as the examples.

Now, the device for eliminating particulates contained in exhaust gas according to the present embodiment, wherein a cylinder-shaped filter is used and the catalyst is carried onto the filter by employing a spraying means, is explained in the following.

FIGS. 6(A) and 6(B) are schematics for showing the device for eliminating particulates contained in exhaust gas according to the third embodiment.

As shown in FIG. 6, the device for eliminating particulates contained in exhaust gas according to the present embodiment is constituted by a capturing means to capture the particulates being cylinder-shaped and an external direction filtration type filter 41A, whereto the particulates contained in the exhaust gas 10a are attached from outside the cylinder-shaped filter 41A, and a catalyst attaching means equipped with an ejecting nozzle 42A on the external side thereof to attach the catalyst solution onto the surface of the particulates, and sprays the catalyst solution 12 onto the surface of the filter 41A while rotating the cylinder-shaped filter 41A and then burns the unburned particulates contained in the exhaust gas after drying the sprayed filter.

In FIG. 6(B), the marked number 43 represents a rotation unit to rotate the filter 41A.

The device for eliminating particulates according to the present embodiment, wherein an external direction filtration type cylinder-shaped filter 41A having the axial core in a direction orthogonal to the vertical axis direction is used and the filter 41A is rotatably set in the exhaust gas treating unit 44 by means of using a rotation unit 43, is constituted by a capturing zone 45 to capture the particulates contained in the exhaust gas 10, a catalyst carrying zone 46 to spray the catalyst solution 12 fed by the ejecting nozzle 42A from the catalyst storing tank 23 onto the rotating filter 11 having captured the particulates, a drying zone 47 to dry the carried catalyst and a burning zone 48 to burn the unburned particulate portion in combination with heat generated by the exhaust gas 10 and the catalytic effect.

However, it should be noted that the catalyst carrying zone 46, the drying zone 47 and the burning zone 48 drawn in FIG. 6 are not the ones to be precisely specified, and these zones are expressed just as a guidepost.

The device for eliminating particulates according to the present embodiment captures the particulates contained in the exhaust gas 10 in the particulate capturing zone 45 to the surface of the filter 41A, sprays the alkaline catalyst solution 12 in the catalyst carrying zone 46 onto the captured particulates so as to cover the surface of the particulates, dries the sprayed catalyst while rotating the filter 41A and burns the particulates in the burning zone 48, thereby allowing to decompose the unburned portion, such as suite and tar, of the particulates at a low temperature as high as 300° C. and to eject the exhaust gas as clean gas 28.

As to the spraying method for the catalyst, any of continuous spray, sprays at prefixed intervals and sprays depending upon the attached amount of the particulates to be detected by means of using a sensor can be employed.

Figure 7A:
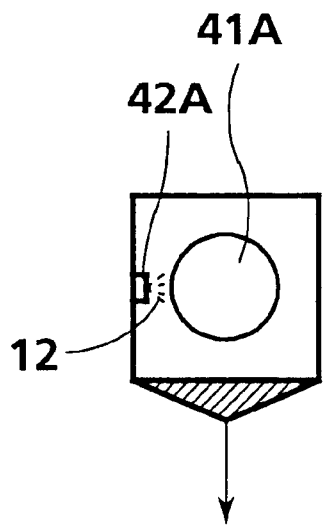
FIG. 7 is a schematic for showing the device for eliminating particulates contained in exhaust gas according to the third embodiment for the present invention, which is equipped with a plurality of nozzles.
Figure 7B:
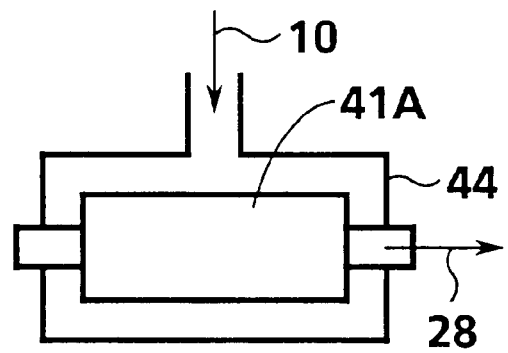
Figure 7C:
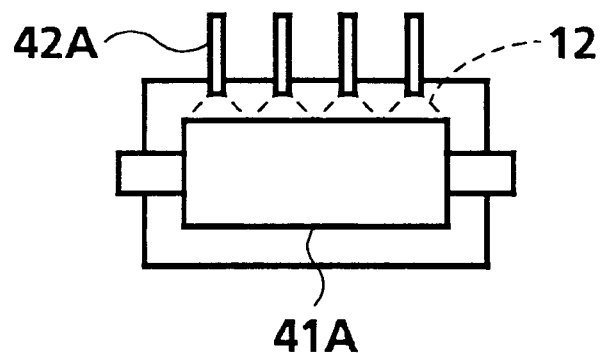

In the present embodiment, as shown in FIG. 7, a plurality of the spray nozzles 42A may be arranged along with the axial direction of the cylinder-shaped filter 41A.

Figure 8:
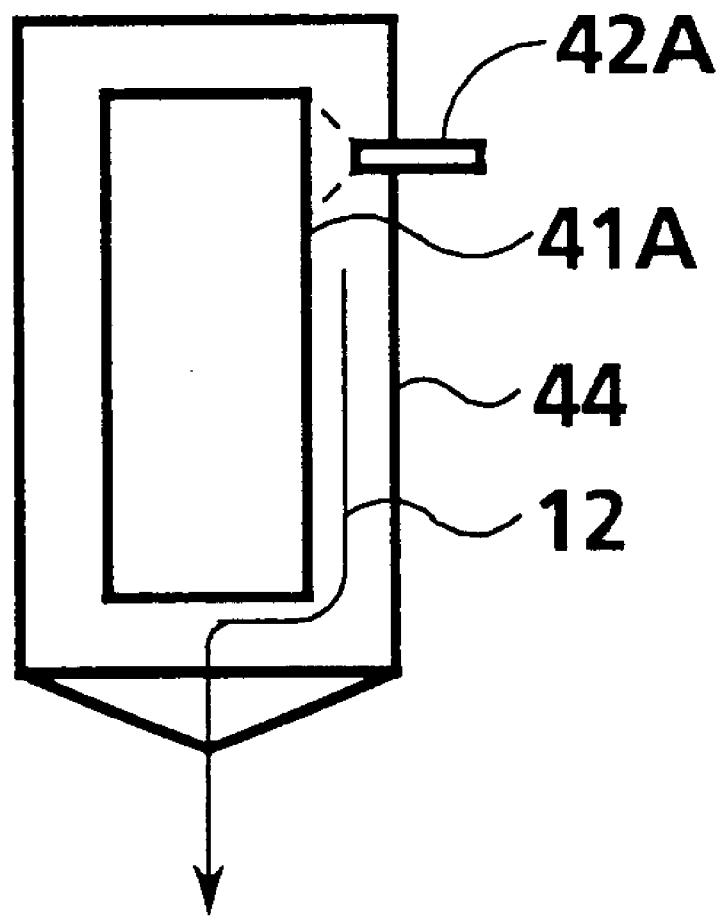
FIG. 8 is a schematic for showing the vertical type device for eliminating particulates contained in exhaust gas according to the third embodiment for the present invention.

In the present embodiment, as shown in FIG. 8, the cylinder-shaped filter may be fixed in vertical direction by adjusting the position of rotation axis of the filter to the vertical axis to make the spray flow from the nozzle 41A downdraft and to reduce the number of the nozzles to be set.

Figure 9:
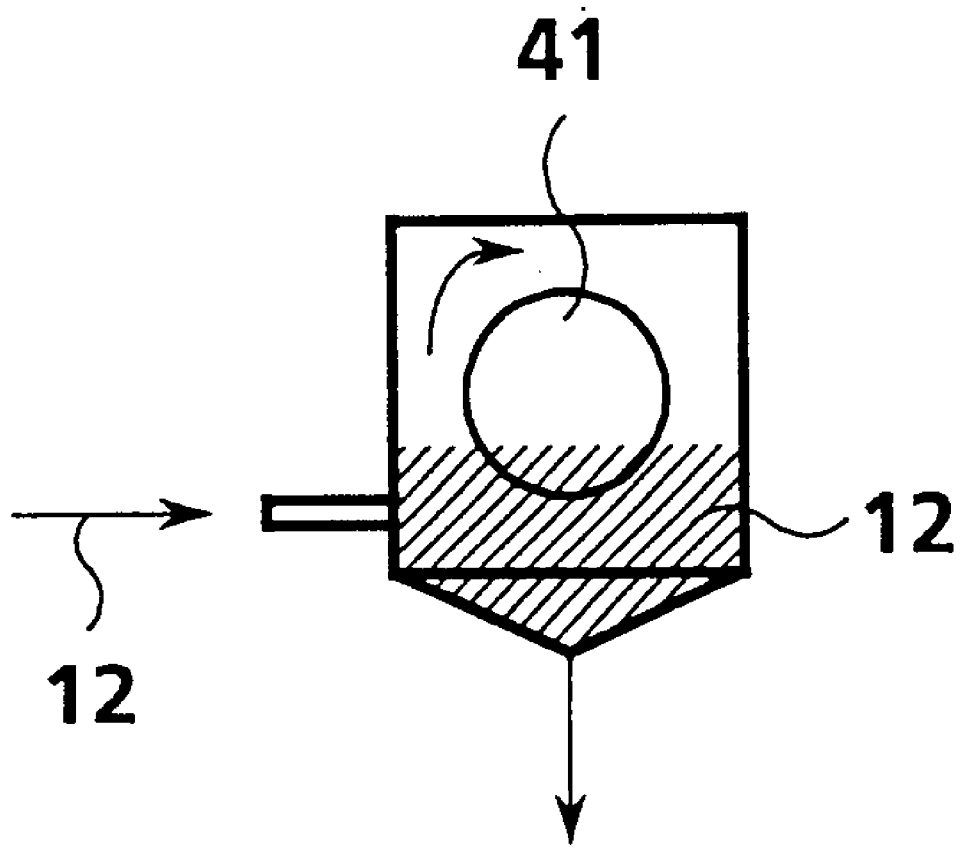
FIG. 9 is a schematic for showing the soaking type device for eliminating particulates contained in exhaust gas according to the third embodiment for the present invention.

Alternatively, instead of spraying the catalyst solution to the filter, the device may be prepared in a type of soaking filter as shown in FIG. 9.

Figure 10A:
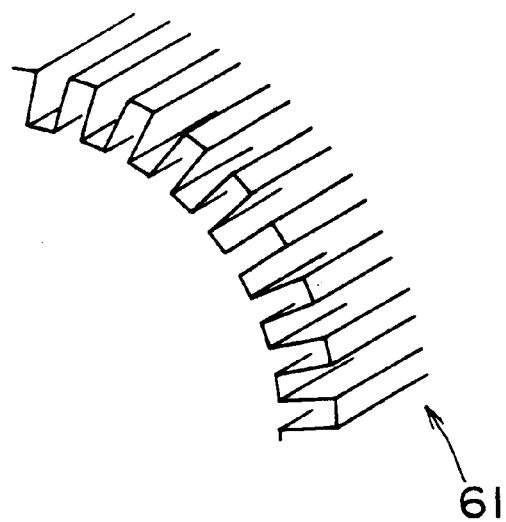
FIG. 10 is a schematic for showing filter of which cross section assumes convexo-concave form according to the third embodiment for the present invention.
Figure 10B:
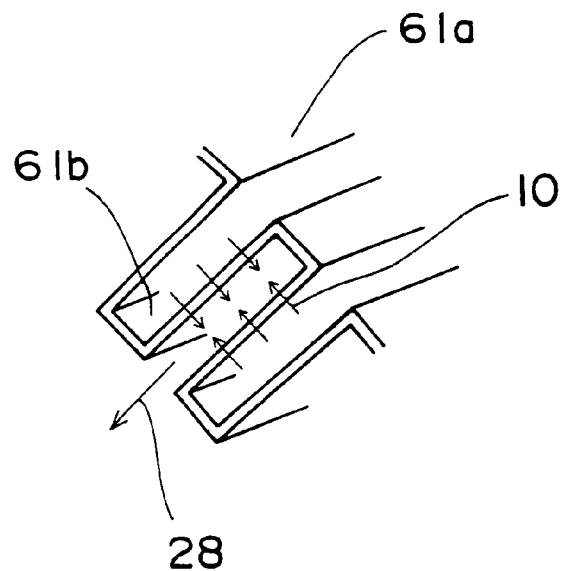
Figure 11A:
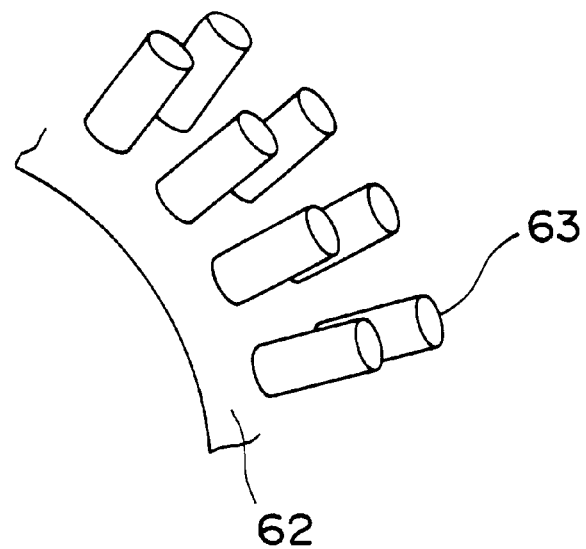
FIG. 11 is a schematic for showing the discoid-shaped filter according to the third embodiment for the present invention.
Figure 11B:
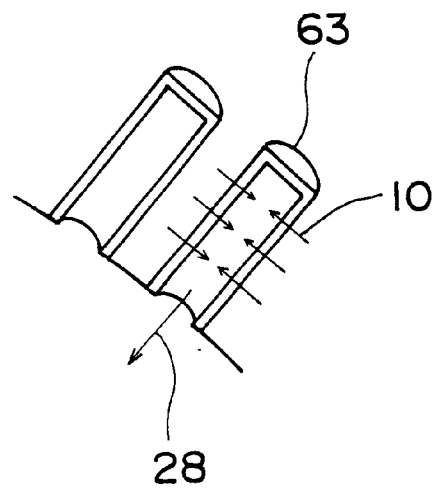

Such soaking type may be suitable for the device of which filter 61 has a cross section in convexo-concave form comprising the convexo 61a and the concave 61b as shown in FIG. 10 and the device comprising a filter in a complex shape, such as small cylinder in group type filter 63, wherein a plurality of gas-permeable cylinders 41a are vertically set on the surface of a cylindrical tube 62 as shown in FIG. 11.

Fourth Embodiment

In this embodiment, the device for eliminating particulates contained in exhaust gas as shown in FIG. 1(C), which uses the internal direction filtration type cylinder-shaped filter and operates the carrying of the catalyst by using the spraying means, is explained.

Figure 12B:
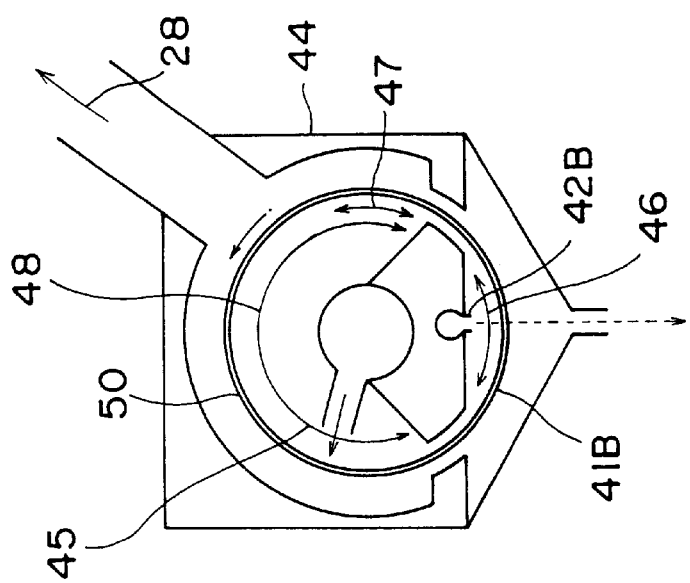
FIG. 12 is a schematic for showing the device for eliminating particulates contained in exhaust gas according to the fourth embodiment for the present invention.
Figure 12A:
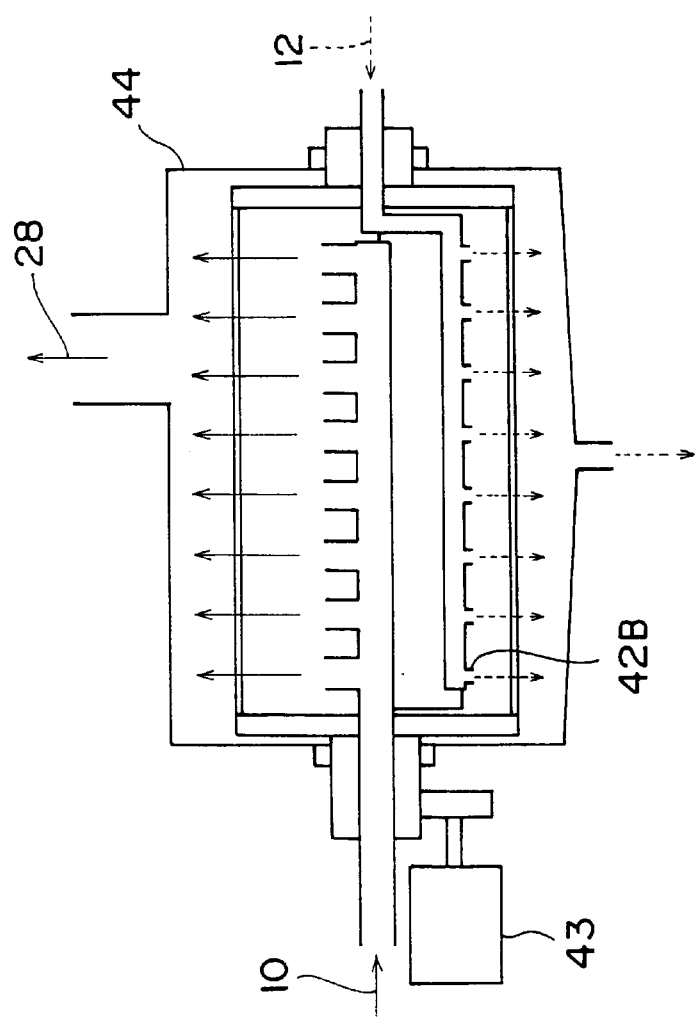

FIGS. 12(A) and 12(B) are schematics for showing the device for eliminating particulates contained in exhaust gas according to the fourth embodiment.

As shown in FIG. 12, the device for eliminating particulates contained in exhaust gas according to the present embodiment is equipped with a capturing means to capture the particulates being an internal filtration type cylinder-shaped filter 41B, ejects the particulates contained in the exhaust gas 10 from the internal side of the cylinder-shaped filter 41B via the gas ejecting tube 50, having therein an ejecting nozzle 42B for the catalyst attaching means to attach the catalyst solution onto the surface of the particulates, sprays the catalyst solution 12 onto the surface of the filter 41B while rotating the cylinder-shaped filter 41B and then burns the unburned particulates in the exhaust gas following to drying the sprayed catalyst.

The device for eliminating particulates according to the present embodiment, wherein an internal direction filtration type cylinder-shaped filter 41B having the axial core in a direction orthogonal to the vertical axis direction is used and the filter 41B is rotatably set in the exhaust gas treating unit 44 by means of using a rotation unit 43, is constituted by a capturing zone 45 to capture the particulates contained in the exhaust gas 10, a catalyst carrying zone 46 to spray the catalyst solution 12 fed by the ejecting nozzle 42A from the catalyst storing tank 23 onto the rotating filter 11 having captured the particulates, a drying zone 47 to dry the carried catalyst and a burning zone 48 to burn the unburned particulate portion in combination with heat generated by the exhaust gas 10 and the catalytic effect.

The device for eliminating particulates according to the present embodiment captures the particulates contained in the exhaust gas 10 in the particulate capturing zone 45 to the surface of the filter 41B, sprays the alkaline catalyst solution 12 in the catalyst carrying zone 46 onto the captured particulates so as to cover the surface of the particulates, dries the sprayed catalyst while rotating the filter 41B and burns the particulates in the burning zone 48, thereby allowing to decompose the unburned portion, such as suite and tar, of the particulates at a low temperature as high as 300° C. and to eject the exhaust gas as clean gas 28.

Fifth Embodiment

In the present embodiment, the device for eliminating particulates contained in exhaust gas uses a fixed filter, which is different from the one using a rotatable filter, and performs the carrying of a catalyst by using a spraying means.

Figure 13:
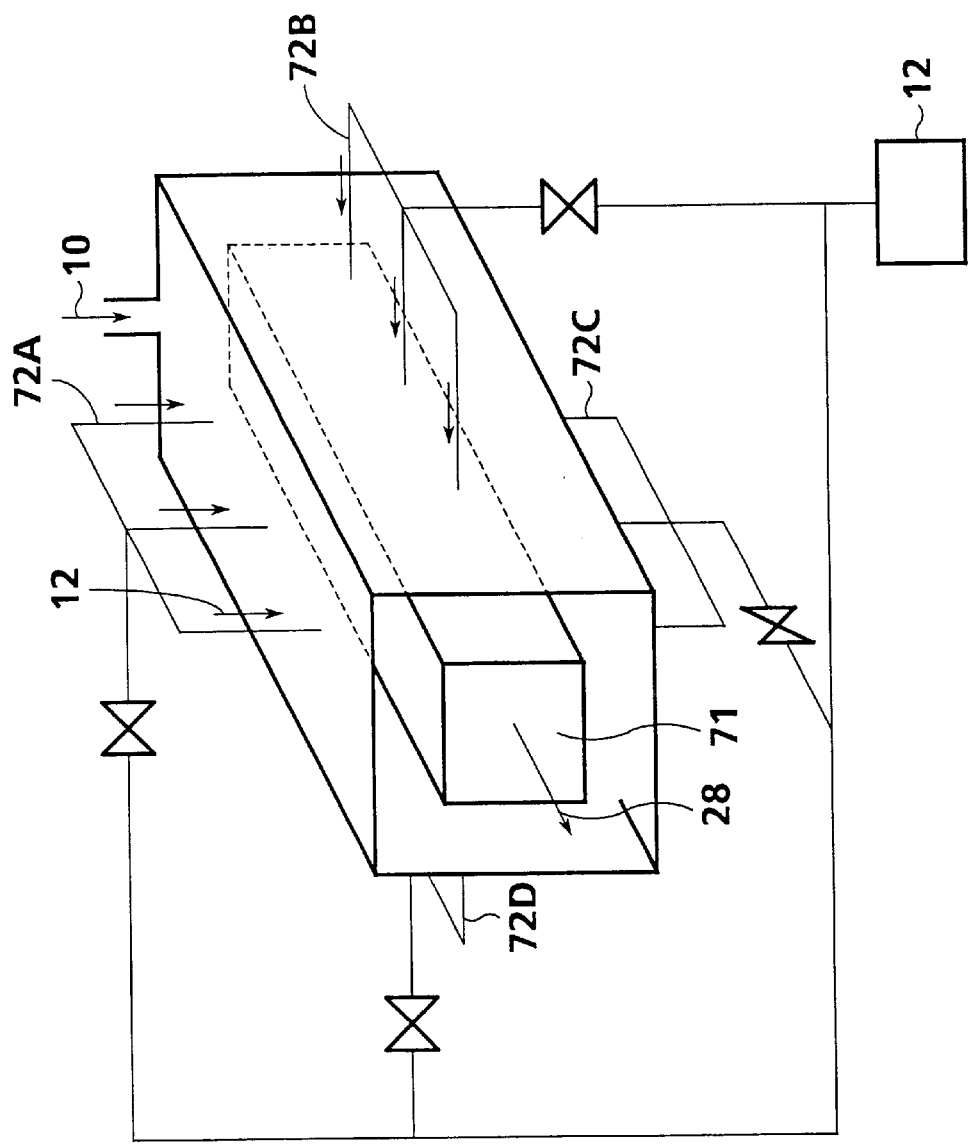
FIG. 13 is a schematic for showing the device for eliminating particulates contained in exhaust gas according to the fifth embodiment for the present invention.

FIG. 13 is a schematic for showing the device for eliminating particulates contained in exhaust gas according to the present embodiment.

As shown in FIG. 13, the device for eliminating particulates contained in exhaust gas according to the present embodiment has a capturing means to capture the particulates which is a fixed pier-shaped filter 71, attaches the particulates in the exhaust gas 10 onto the outside of the filter 71, has a catalyst attaching means equipped with four spray nozzles 2 A–D on the exterior circumference of the catalyst attaching means to attach the catalyst solution 12 onto the surface of the particulates and burns the unburned particulates in the exhaust gas following to drying of the catalyst.

Although the pier-shaped filter is used for the fixed filter in the present embodiment, there is no limitation in the shape to be used. A cylinder-shaped and a polygon-shaped filter are also usable, which may be sprayed with the catalyst solution 12 in turn while switching the exhaust gas to be covered.

Sixth Embodiment

In the present embodiment, the device for eliminating particulates contained in exhaust gas using a fixed filter and performing the carrying of a catalyst by using the spraying means is provided.

Figure 14A:
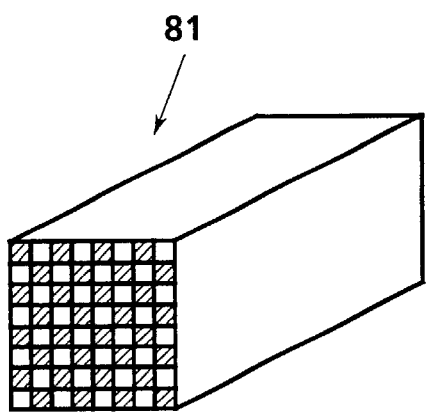
FIG. 14 is a schematic for showing the device for eliminating particulates contained in exhaust gas according to the sixth embodiment for the present invention.
Figure 14B:
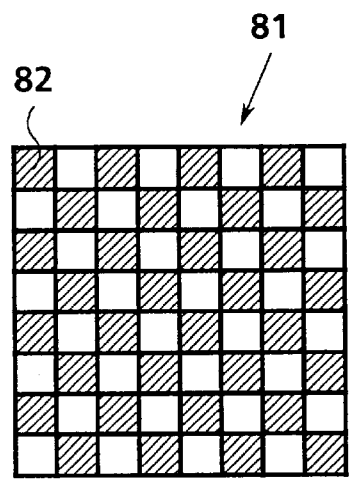
Figure 14C:
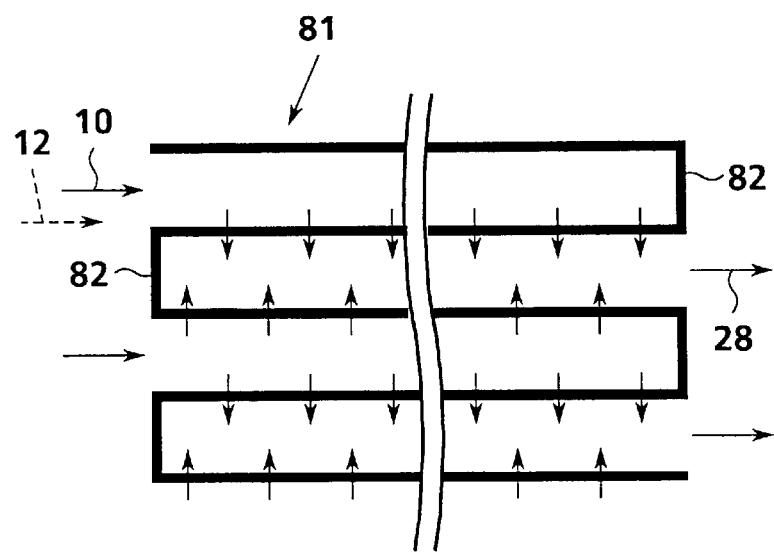

FIG. 14 is a schematic for showing the device for eliminating particulates contained in exhaust gas according to the sixth embodiment.

As shown in FIG. 14, the device for eliminating particulates contained in exhaust gas according to the present embodiment has a capturing means to capture the particulates which is a fixed pier-shaped filter 81, attaches the particulates in the exhaust gas 10 onto the outside of the filter 81, sprays the catalyst solution 12 onto the surface of the particulates being captured on the filter 81 by using the spraying nozzle (not shown in Fig.) and burns the unburned particulates portion in the exhaust gas following to drying of the sprayed catalyst.

The filter 81 to capture the particulates in the present embodiment is a honeycomb-shaped filter having a checkered pattern on the end surface thereof, which is constituted by alternatively closing the end with a choke 82.

As a method to attach the catalyst, it is not limited to said spraying method, and any methods capable of appropriately carrying the catalyst onto the filter, such as a method to soak the internal part of the filter with the catalyst solution, may be employed without limitation.

Seventh Embodiment

In the present embodiment, the device for eliminating particulates contained in exhaust gas using a fixed filter and performing the carrying of a catalyst by using a spraying means is provided.

Figure 15A:
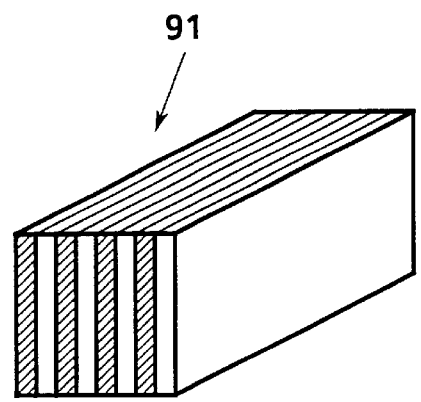
FIG. 15 is a schematic for showing the device for eliminating particulates contained in exhaust gas according to the seventh embodiment for the present invention.
Figure 15B:
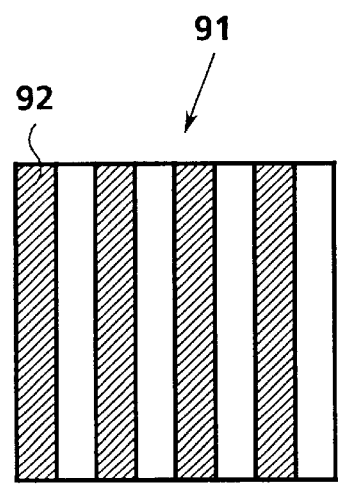
Figure 15C:
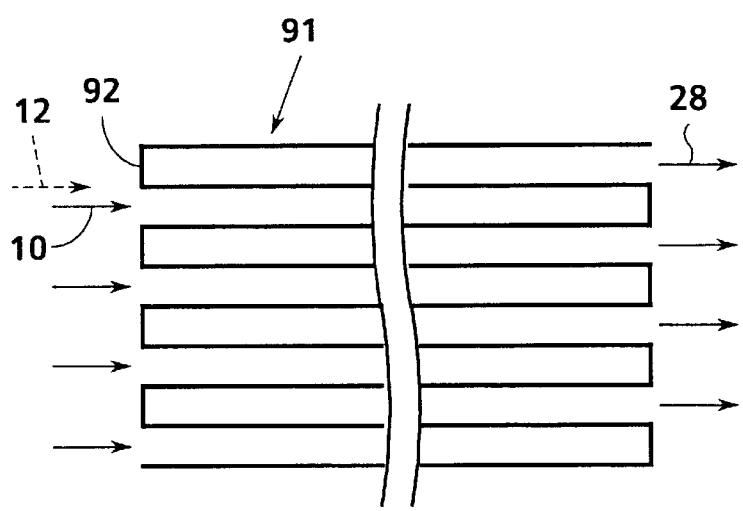

FIG. 15 is a schematic for showing the device for eliminating particulates contained in exhaust gas according to the seventh embodiment.

As shown in FIG. 15, the device for eliminating particulates contained in exhaust gas according to the present embodiment has a capturing means to capture the particulates which is a laminated filter 91 having a canaliform structure by folding a plate-shaped filter, attaches the particulates in the exhaust gas 10 onto the surface of the filter 91, sprays the catalyst solution 12 onto the surface of the particulates being captured on the filter 91 by using spraying nozzles (not shown in FIG.) and burns the unburned particulates portion in the exhaust gas following to drying of the sprayed catalyst. The marked number 92 represents a choke.

In the device according to this embodiment, the laminated type filter 91 may be constituted by laminating plate-shaped filters in multilayer and alternatively closing the both end sides with chokes 92.

Since the parts of the end sides of the laminated filter 91 of the present embodiment other than the parts closed with the chokes are opened, the unburned particulates attached to the surface of the filter can be cleaned up and eliminated easily.

Eighth Embodiment

In the present embodiment, the device for eliminating particulates contained in exhaust gas using a fixed filter and performing the carrying of a catalyst by using a spraying means is provided.

Figure 16A:
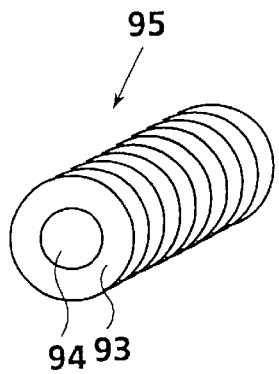
FIG. 16 is a schematic for showing the device for eliminating particulates contained in exhaust gas according to the eighth embodiment for the present invention.
Figure 16B:
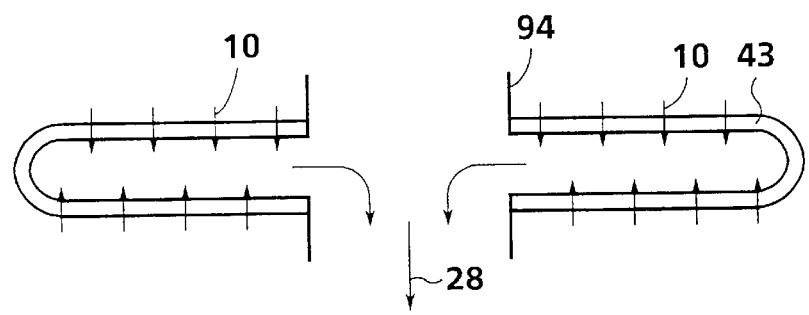
Figure 16C:
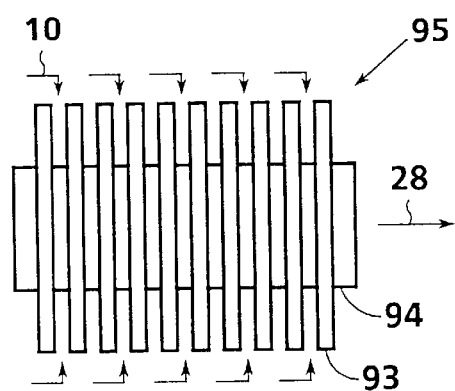

FIG. 16 is a schematic for showing the device for eliminating particulates contained in exhaust gas according to the eighth embodiment.

As shown in FIG. 16, the device for eliminating particulates contained in exhaust gas according to the present embodiment has a capturing means to capture the particulates which is a filter 95 constituted by setting a plurality of doughnut-shaped discoid filters in hollow 93 in the internal cylinder 94, attaches the particulates in the exhaust gas 10 onto the surface of the filter 91, sprays the catalyst solution 12 onto the surface of the particulates being captured on the filter 91 by using spraying nozzles (not shown in FIG.) and burns the unburned particulates in the exhaust gas following to drying of the sprayed catalyst.

Although the discoid-shaped and cylinder-shaped filters or fixed type filter are exemplified above as the filter apparatus to be used in this embodiment, there is no limitation for the filters, and any types of filters which can efficiently capture the particulates contained in exhaust gas may be used.

Figure 17A:
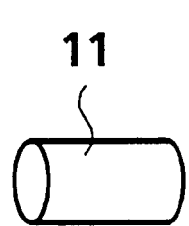
FIG. 17(A) shows single filter mode with either a rotatable cylinder-shaped filter or a fixed type filter.

There are various methods for installing the filter, and an example for the installation is shown in FIG. 17. FIG. 17(A) shows an independent and either rotating or fixed type filter being in a cylindrical shape.

Figure 17B:
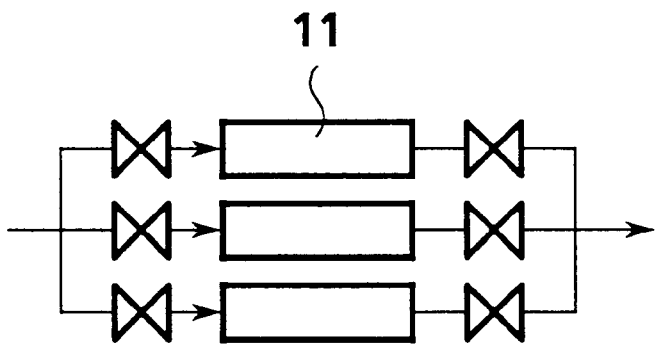
FIG. 17(B) shows the switchable type filter wherein three filters are arranged in parallel by means of tubing and are used in turn by switching from one to another.

FIG. 17(B) shows a filter system constituted by three filters arranged in parallel by means of tubing to perform absorption of the particulates onto the filter, drying of the filter and burning of the particulates in turn by switching the filters to be used from one to another.

Figure 17C:
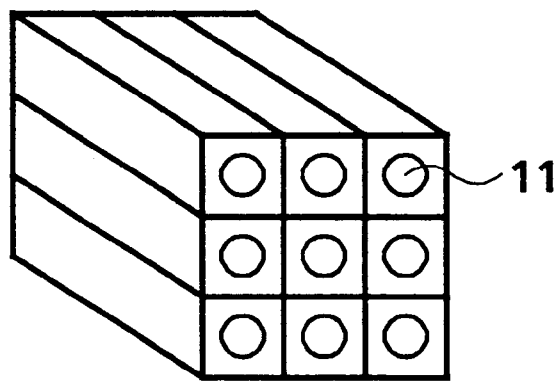
FIG. 17(C) shows unit type filter constituted by a plurality of filters.

FIG. 17(C) shows an unit type filter comprising a plurality of filters.

Now, an example for an exhaust gas cleaning system equipped with the various devices for eliminating particulates in exhaust gas described above is explained hereinbelow, however, it should be noted that the scope of the present invention shall not be limited to the following description.

Ninth Embodiment

Figure 18:
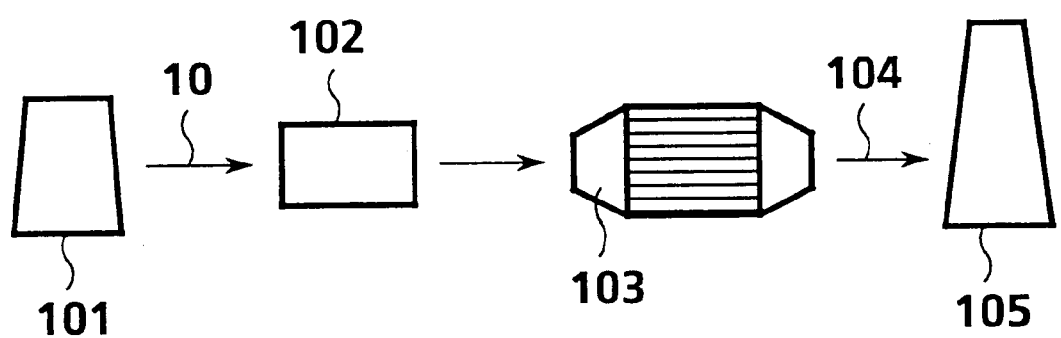
FIG. 18 is a schematic for showing the exhaust gas 1cleaning up system according to the ninth embodiment for the present invention.

FIG. 18 is a schematic for showing the exhaust gas cleaning up system according to the present embodiment.

As shown in FIG. 18, the exhaust gas cleaning up system of this embodiment is a system to clean up exhaust gas ejected from motors and is constituted by mounting a particulate eliminating device 102, which is located in the exhaust gas feeding path from motors, large diesel engines 101 for ships, to decompose and treat floating particulates contained in the exhaust gas 10 and a denitification device 103 equipped at the downstream side of the particulate eliminating device 102 to eliminate the particulates and hazardous substance, such as nitrogen oxide, thereby allowing to eject clean gas 104 from a chimney 105.

Tenth Embodiment

Figure 19:
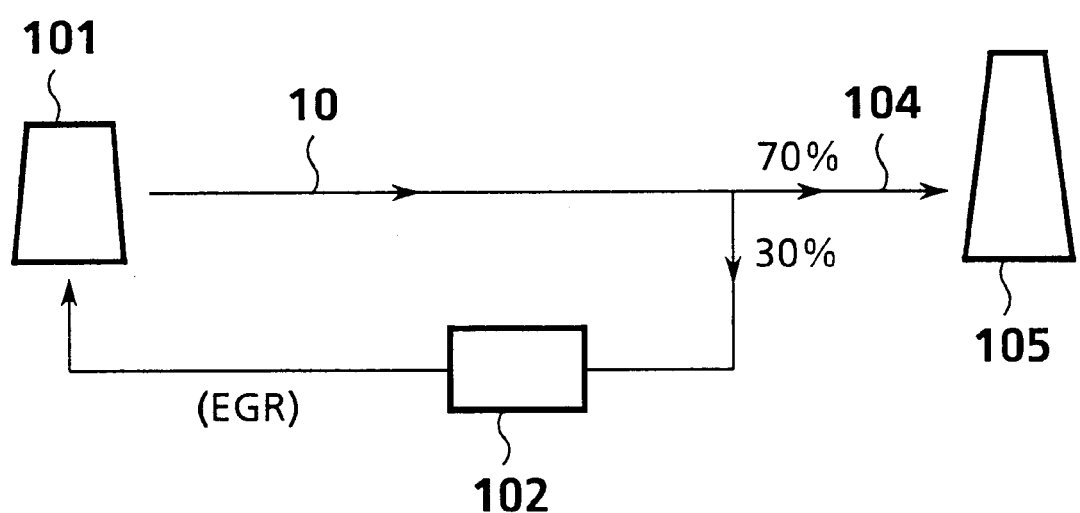
FIG. 19 is a schematic for showing the exhaust gas cleaning up system according to the tenth embodiment for the present invention.

FIG. 19 is a schematic for showing the exhaust gas cleaning up system according to the tenth embodiment for the present invention.

As shown in FIG. 19, the exhaust gas cleaning up system of the present embodiment is a system to clean up the exhaust gas ejected from motors and is constituted by mounting a particulate eliminating device 102, which is located in the exhaust gas feeding path from motors, large diesel engines 101 for ships, to decompose and treat floating particulates contained in the exhaust gas 10, and the system is constituted as an exhaust gas recycling system (EGR) to recycles and circulates the part of the exhaust gas, approximately 30% more or less, which is ejected from an engine 101 to a diesel engine 101.

Although exhaust gas is a factor to down the combustion temperature, this system of the present embodiment allows to eject clean exhaust gas from which particulates have been eliminated, thereby allowing to reduce the amount of nitrogen oxides in total produced in exhaust gas over a long time.

In particular, the present system is suitably applied for diesel engines to be used for surface transport vehicles other than for ships.

Eleventh Embodiment

Figure 20:
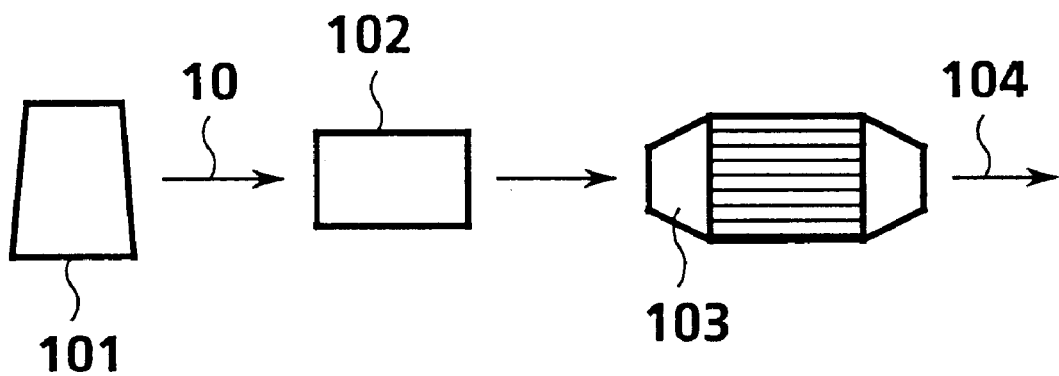
FIG. 20 is a schematic for showing the exhaust gas cleaning up system according to the eleventh embodiment for the present invention.

FIG. 20 is a schematic for showing the exhaust gas cleaning up system according to the eleventh embodiment.

As shown in FIG. 20, the exhaust gas cleaning up system of this embodiment is a system to clean up exhaust gas ejected from motors, such as motors for surface transportation vehicles including motortrucks, buses, roller cars, folklifts and shoveling cars and overland-fixed motors including compressors and generators, and is constituted by mounting a particulate eliminating device 102, which is located in the exhaust gas feeding path from a diesel engines 101 as a motor, to decompose and treat floating particulates contained in the exhaust gas 10 and a denitification device 103 equipped at the downstream side of the particulate eliminating device 102 to eliminate the particulates and hazardous substance, such as nitrogen oxide, thereby allowing to eject clean gas 104 to the outdoor.

Twelfth Embodiment

Figure 21:
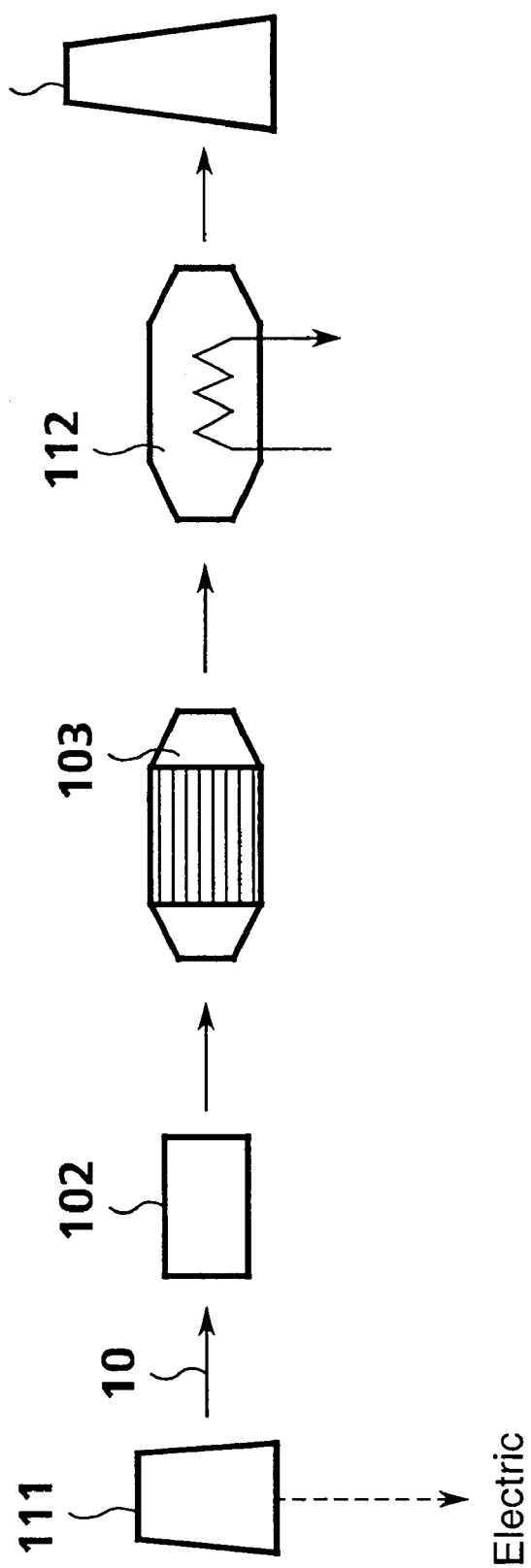
FIG. 21 is a schematic for showing the exhaust gas cleaning up system according to the twelfth embodiment for the present invention.

FIG. 21 is a schematic for showing the exhaust gas cleaning up system according to the twelfth embodiment.

As shown in FIG. 21, the exhaust gas cleaning up system of this embodiment is corresponding to the cogeneration system and is constituted by mounting a particulate eliminating device 102, which is located in the exhaust gas feeding path from a diesel engine generator 111 outputting electricity. In the present system, a denitification device 103 is equipped at the downstream side of the particulate eliminating device 102 to eliminate the particulates and hazardous substance, such as nitrogen oxide, thereby allowing to eject clean gas 104 to the outdoor. And, the system recovers heat as hot water by using a heat-recovering boiler 112 at ejecting the clean gas 104 and is aiming at improving energy utilization efficiency.

Consequently, the system according to the present embodiment enables to constitute a system capable of decomposing and treating the unburned portion of the floating particulates (SPM) contained in the exhaust gas ejected from motors, such as diesel engines for ships, surface transportation vehicles and overland fixed use, at a low temperature.

Thirteenth Embodiment

Figure 22:
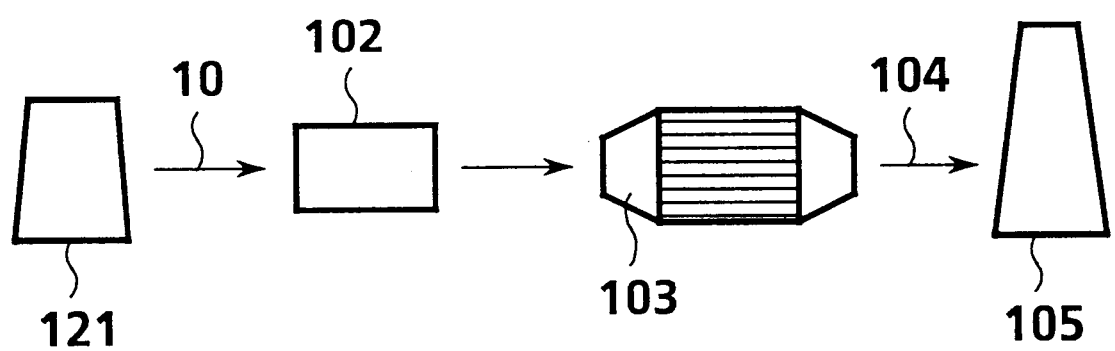
FIG. 22 is a schematic for showing the exhaust gas cleaning up system according to the thirteenth embodiment for the present invention.

FIG. 22 is a schematic for showing the exhaust gas cleaning up system according to the thirteenth embodiment.

As shown in FIG. 22, the exhaust gas cleaning up system according to the present embodiment is a system to clean up exhaust gas ejected from a gasification furnace and is constituted with a particulate eliminating device 102, which is mounted in the smoke feeding path from the gasification furnace 121, to decompose and treat the floating particulates contained in the exhaust gas 10 and a denitification device 103 equipped at the downstream side of the particulate eliminating device 102, thereby eliminating the particulates and hazardous substance, such as nitrogen oxides, to eject cleaned up gas 104 through a chimney 105.

As described above, the exhaust gas cleaning up system according to the present invention allows to decompose and eliminate particulates contained in exhaust gas ejected not only from motors but also from various incinerators, such as urban garbage incinerators, industrial waste incinerators and sludge incinerators, thermal decomposition furnaces, fusion furnaces, etc.

What is claimed is:

1. A process for eliminating particulates in exhaust gas, the process including:
    a step to capture the particulates,
    a step to attach a catalyst solution in a state of solution onto the surface of the captured particulates such that the overall surface of the particulates is covered with the catalyst solution and the catalyst solution is caused to penetrate into fine pores contained in the particulates, and
    a step to burn and decompose the particulates in the presence of the catalyst following to drying of the particulates attached with the catalyst solution, wherein the catalyst solution is any of a catalyst solution containing at least one of alkali metals and alkaline earth metals, seawater, and seawater containing at least one of the alkali metals and the alkaline earth metals, wherein the catalyst solution is applied to the particulates from outside of a flow of exhaust gas.

2. The process to eliminate particulates in exhaust gas according to claim 1, the process further including a step to spray the catalyst solution onto the surface of the particulates being attached onto the surface of the capturing means and a step to attach the catalyst solution onto the surface of the captured particulates.

3. The process to eliminate particulates in exhaust gas according to the claim 1, the process further including a step to soak the capturing means whereto the particulates having been attached onto the surface thereof into the catalyst solution and a step to attach the catalyst solution onto the surface of the captured particulates.

4. A device for eliminating particulates contained in exhaust gas, the device comprising:
    a capturing means to capture the particulates; and
    a catalyst attaching means to attach catalyst solution in a state of solution onto the surface of the particulates so as to cover the overall surface of the particulates captured by the capturing means with the catalyst solution and causes the catalyst solution to penetrate into fine pores contained in the particulates, wherein the captured particulates are dried, burned, and decomposed, wherein the catalyst solution is any of a catalyst solution containing at least one of alkali metals and alkaline earth metals, seawater, and seawater containing at least one of the alkali metals and the alkaline earth metals, and wherein the catalyst solution is applied to the particulates from outside of a flow of exhaust gas.

5. A exhaust gas treating system to clean up the exhaust gas, wherein the system is set onto the flue for the exhaust gas and has the particulate eliminating device according to claim 4 to decompose and treat the floating particulates in the exhaust gas.

6. The exhaust gas treating system to clean up the exhaust gas according to the claim 5, further including a denitrification device to decompose and treat nitrogen oxides in the exhaust gas at the downstream side of the particulate eliminating device.

7. The device for eliminating particulates contained in exhaust gas according to claim 4, wherein the catalyst attaching means is structured to recover the remaining of the catalyst solution.

8. The device for eliminating particulates contained in exhaust gas according to the claim 4, wherein the catalyst attaching means to attach the catalyst solution onto the surface of the particulates is characterized by being equipped with a spraying means to spray the catalyst solution to the capturing means by which the particulates are captured.

9. The device for eliminating the particulates in exhaust gas according to the claim 4, wherein the catalyst attaching means to attach the catalyst solution onto the surface of the particulates is a soaking means to soak the capturing means having captured the particulates into the catalyst solution.

10. The device for eliminating the particulates in exhaust gas according to the claim 4, wherein the catalyst is carried onto the capturing means.

11. The device for eliminating the particulates in exhaust gas according to any one of claims 8, 9, 10, and 4 wherein the capturing means to capture the particulates is either a discoid-shaped filter or a cylinder-shaped filter.

12. The device for eliminating particulates in exhaust gas according to the claim 11, wherein the filter is either an internal direction filtration type to flow out the exhaust gas introduced into the inside of the filter or an external direction filtration type to vent the exhaust gas being introduced into the exterior of the filter into the inside of the filter.

13. The device for eliminating particulates in exhaust gas according to the claim 12, wherein the filter has a laminated structure having a supporting layer to hold the strength of the filter and a capturing layer to capture the particulates being laminated on the supporting layer.

14. The device for eliminating particulates in exhaust gas according to the claim 13, wherein a protective layer is provided on the surface of the capturing layers to capture the particulates.

15. The device for eliminating particulates in exhaust gas according to the claim 11, wherein the cross section of the filter assumes a convexo-concave shape.

16. The device for eliminating particulates in exhaust gas according to the claim 11, wherein a plurality of cylinder-shaped filters are set in standing state onto the surface of the filter.

17. The device for eliminating particulates in exhaust gas according to the claim 11, wherein the capturing means to capture the particulates is a discoid-shaped filter, and the catalyst attaching means to attach the catalyst solution onto the surface of the particulates is set at the surface side of the discoid-shaped filter, wherein the device rotates the discoid-shaped filter, then sprays the catalyst solution onto the surface of the filter at the different positions on the same side of the surface of the discoid-shaped filter, and burns the particulates having been not burned in the exhaust gas following to drying of the said filter to eliminate the particulates.

18. The device for eliminating particulates in exhaust gas according to the claim 11, wherein the capturing means to capture the particulates is a cylinder-shaped filter, the catalyst attaching means to attach the particulates in the exhaust gas from either side of the inside or the outside of the cylinder-shaped filter and to attach the catalyst solution onto the surface of the particulates is set to the interior side of the lateral side of the cylinder-shaped filter in case of the internal direction filtration type or is set to the exterior side of the lateral side of the cylinder-shaped filter in case of the external direction filtration type, and wherein the device sprays the catalyst solution onto the surface of the filter while rotating the cylinder-shaped filter and burns the particulates having been not burned in the exhaust gas following to drying of the sprayed filter to eliminate the particulates.

19. The device for eliminating particulates in exhaust gas according to the claim 11, wherein the capturing means to capture the particulates is either a cylinder-shaped filter or a polygon-shaped filter, and at least the two catalyst attaching means to attach the particulates in the exhaust gas from the outside of either the cylinder-shaped filter or the polygon-shaped filter and to attach the catalyst solution onto the surface of the particulates are arranged in the circumferential direction of the filter, wherein the device sprays the catalyst solution from the surrounding of the filter onto the surface of the filter while switching the catalyst attaching means and burns the particulates having been not burned in the exhaust gas following to drying of the sprayed filter.

20. The device for eliminating particulates in exhaust gas according to the claim 11, wherein the capturing means to capture the particulates is a honeycomb-shaped filter provided with a choke of which end surface being checked pattern, wherein the device attaches the particulates in the exhaust gas onto the surface of the filter, sprays the catalyst solution onto the surface of the particulates and then burns the particulates having been not burned in the exhaust gas following to drying of the sprayed filter.

21. The device for eliminating particulates in exhaust gas according to the claim 11, wherein the capturing means to capture the particulates is a laminated type filter including laminated plate-shaped filters of which end parts are alternatively choked, characterized in that the device attaches the particulates in the exhaust gas onto the surface of the filter, sprays the catalyst solution onto the surface of the particulates and then burns the particulates in the exhaust gas having been not burned following to drying of the sprayed filter.

22. The device for eliminating particulates in exhaust gas according to the claim 11, wherein the capturing means to capture the particulates is a laminated type filter including folding plate-shaped filters, characterized in that the device attaches the particulates in the exhaust gas onto the surface of the filter, sprays the catalyst solution onto the surface of the particulates and then burns the particulates having been not burned in the exhaust gas following to drying of the sprayed filter.

23. The device for eliminating particulates in exhaust gas according to the claim 11, wherein the capturing means to capture the particulates includes arranging a plurality of doughnut-shaped, fistulous and discoid filters in parallel, characterized in that the device attaches the particulates in the exhaust gas onto the surface of the filter, sprays the catalyst solution onto the surface of the particulates and then burns the particulates having been not burned in the exhaust gas following to drying of the sprayed filter.

* * * * *